March 20, 1962 P. R. CONTANT 3,025,552
WINDSHIELD WIPER MECHANISM
Filed Feb. 24, 1960 3 Sheets-Sheet 1
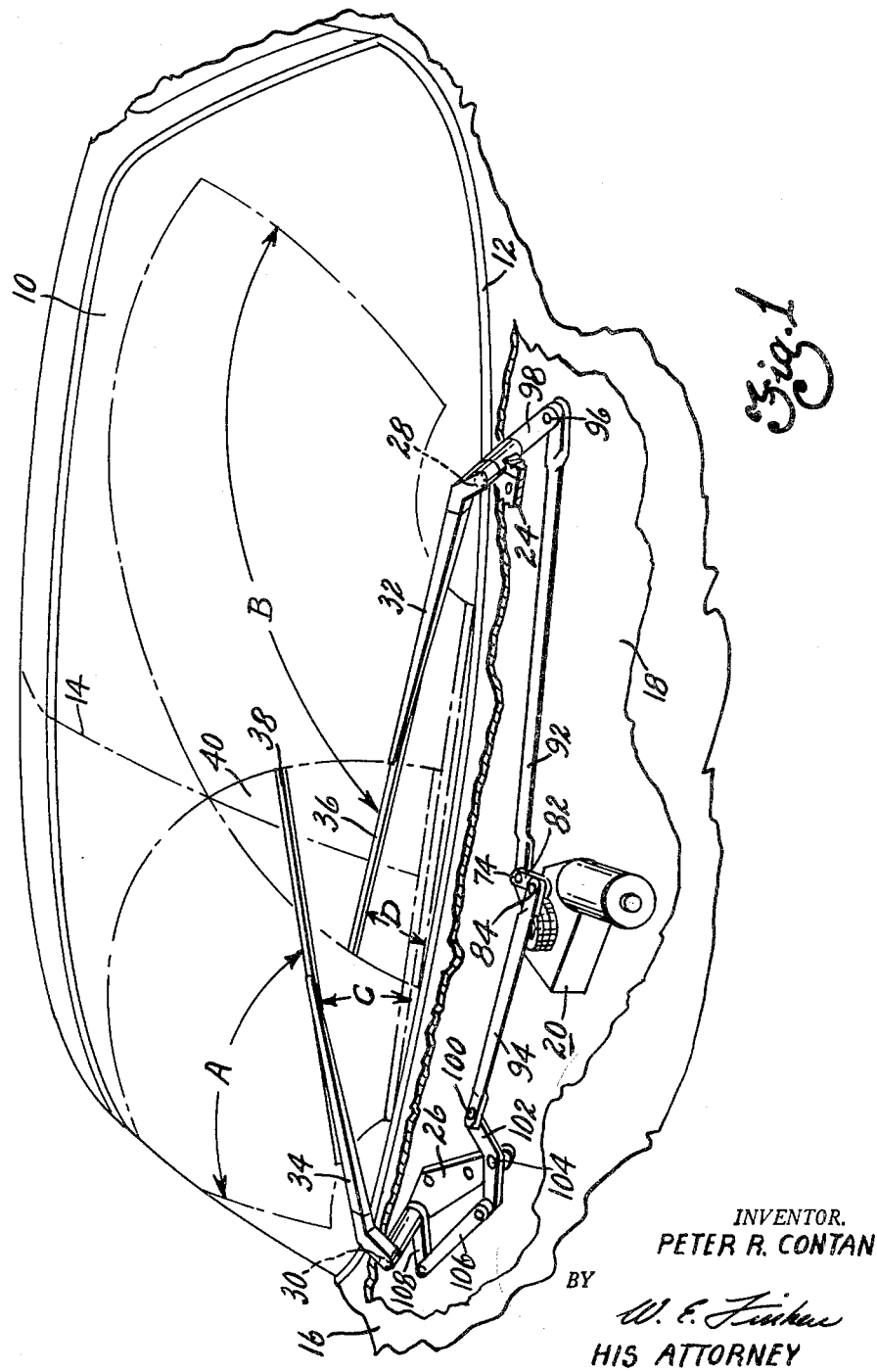
INVENTOR.
PETER R. CONTANT
BY
*W. E. Finken*
HIS ATTORNEY

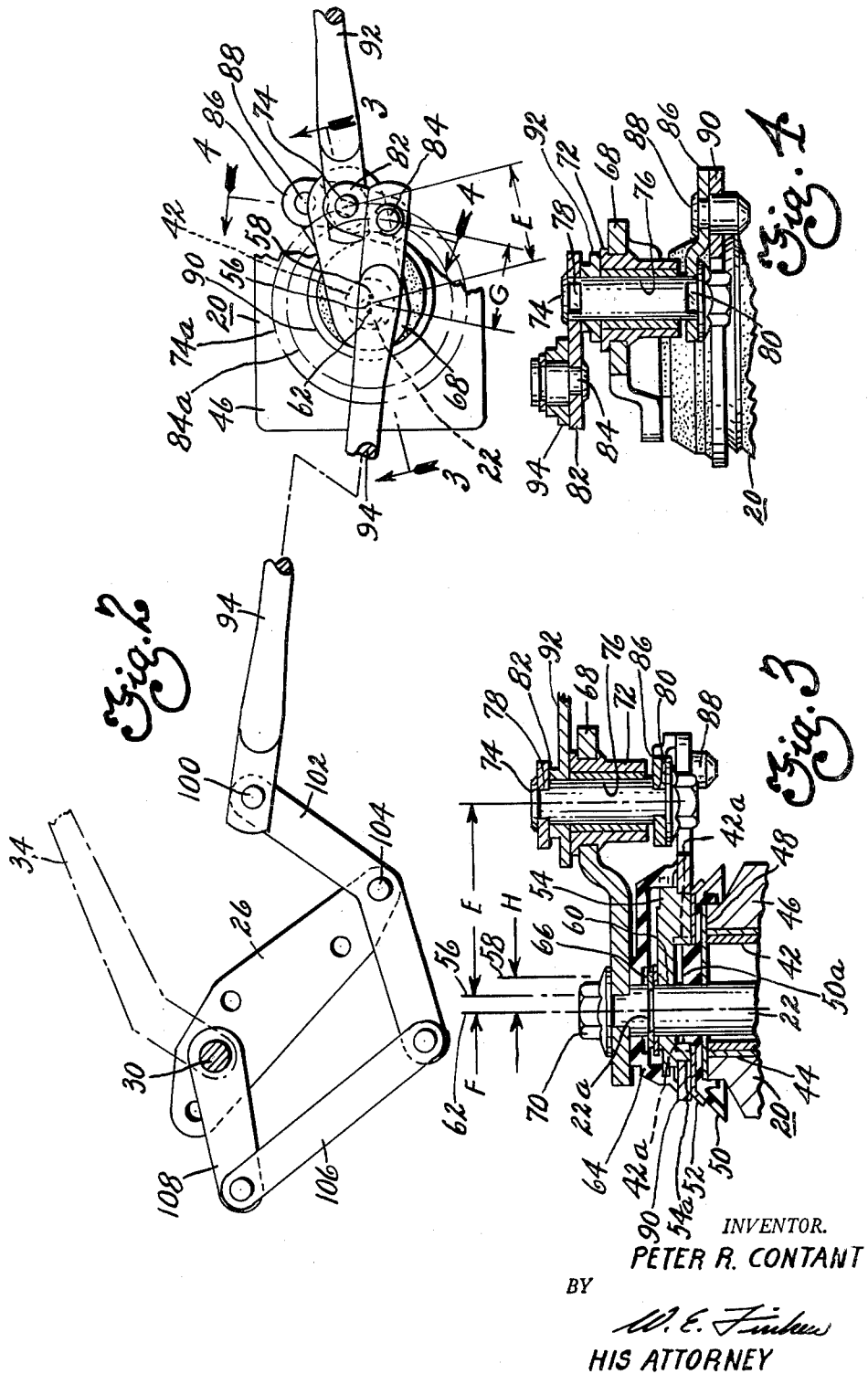

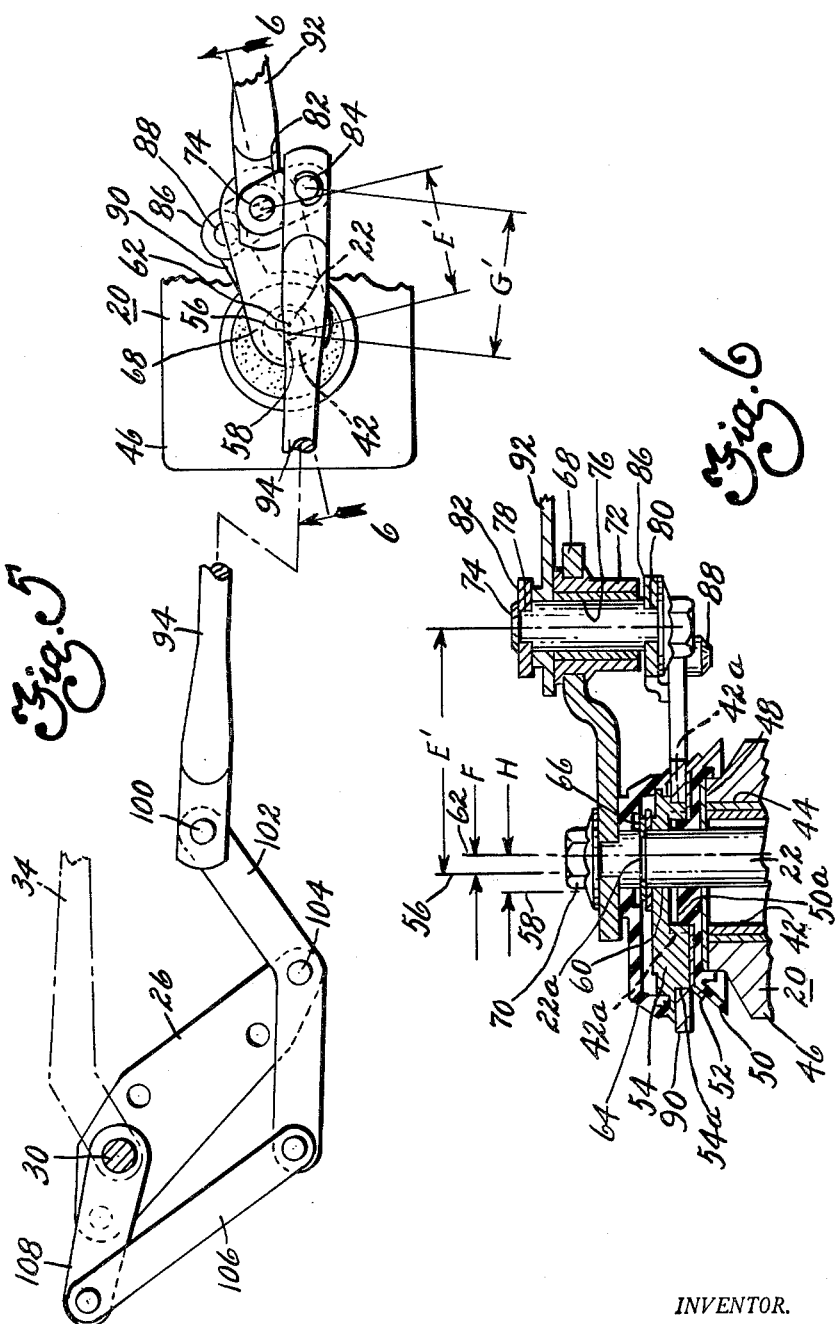

United States Patent Office 3,025,552
Patented Mar. 20, 1962

3,025,552
WINDSHIELD WIPER MECHANISM
Peter R. Contant, Rochester, N.Y., assignor to General Motors Corporation, Detroit, Mich., a corporation of Delaware
Filed Feb. 24, 1960, Ser. No. 10,661
12 Claims. (Cl. 15—250.16)

This invention pertains to windshield wiper mechanisms, and particularly to an improved drive mechanism for asymmetrically oscillated wiper blades having overlapped wiping paths adjacent their inboard stroke ends.

At the present time some vehicles are equipped with windshield cleaning mechanisms comprising a pair of asymmetrically oscillated wiper blades and drive means whereby the wiping paths of the blades overlap adjacent their inboard stroke ends. A windshield cleaning mechanism of this type is disclosed in copending application Serial No. 756,097 filed August 20, 1958, in the name of Robert M. Fox et al., and assigned to the assignee of this invention, in which the overlap is approximately one-fourth of the blade length. The present invention relates to the modified drive mechanism wherein the overlap may be equal to substantially one-half of the wiper blade length, and which, in some instances may be as long as ten inches. Accordingly, among my objects are the provision of windshield wiping mechanism including a pair of asymmetrically oscillated wiper blades, one of which overlaps substantially half of the other wiper blade in the parked position; the further provision of a variable throw crank assembly for actuating a pair of asymmetrically oscillated wiper blades which overlap substantially half the length of the blades, and which precludes interference between the blades; and the still further provision of a variable throw crank assembly of the aforesaid type including linkage means and a double eccentric arrangement for obtaining differential parking strokes of the two wiper blades.

The aforementioned and other objects are accomplished in present invention by incorporating an offset crank assembly in the drive linkage in combination with eccentrically actuated linkage means for differentially varying the throw of the crank assembly during parking operation. In addition, the geometry of the drive linkage is designed to preclude blade interference during operation. Specifically, the wiper mechanism, as disclosed, includes an electric motor driven wiper unit of the general type disclosed in copending application Serial No. 718,789 filed March 3, 1958, now Patent No. 2,985,024, in the name of Peter R. Contant et al., and assigned to the assignee of this invention. Thus, the wiper unit includes eccentric means for shifting the axis of a rotary crank shaft after substantially arresting rotation thereof so as to increase the throw of the crank assembly during parking operation.

The wiper unit comprises a rotatable driving member having a rotatable driven element, in the form of a shaft, eccentrically journalled therein. The shaft extends through an eccentric element, or cap, connected to rotate with the driving member. A first crank arm is drivingly connected to the driven element, or shaft, and rotatably supports a crank pin adjacent its outer end. A second crank arm is rigidly connected to the crank pin and carries a second crank pin in at its outer end. A first link is drivingly connected to the first crank pin at one end and carries a pin at its other end, the second crank arm and the first link having a fixed angular relationship at all times. A second link is journalled on the periphery of the eccentric cap at one end, and rotatably supports the pin carried by the first link at its other end. The two crank pins are located on the same side of the axis of the driven element, or crank shaft.

The inner end of a connecting link for the driver's wiper blade is pivotally connected to the crank pin of the first crank arm, and the inner end of a connecting link for the passenger's wiper blade is pivotally connected to the crank pin carried by the second crank arm. The connecting link for the driver's wiper blade is operatively connected to a drive arm attached to a pivot shaft on the driver's side of the vehicle. The connecting link for the passenger's blade is operatively connected to one end of a reversing link, or bellcrank, having a fixed intermediate pivotal support. The other end of the reversing link is rotatably connected to one end of a connecting arm, the other end of which is rotatably connected to a drive arm attached to the pivot shaft for the passenger's wiper blade. The reversing link on the passenger's side of the vehicle reverses the motion so that the two spaced pivot shafts will be oscillated asymmertically during rotation of the crank assembly.

The geometry of the linkage of the passenger's blade is such that during running operation wherein the crank pins rotate with the driving member about the axis thereof, the wiping stroke will be throughout an angle of approximately 75°. The geometry of the drive linkage for the driver's wiper blade is such that during running operation the wiping stroke will be approximately 90°. By proportioning the wiping strokes of the two blades, and by having a predetermined angular offset between the running inboard stroke end limits of the two blades, the wiping paths of the blades will overlap in the center of the windshield without interference.

During parking operation, rotation of the crank shaft is arrested while the driving member and eccentric cap continue to rotate thereby shifting the axis of the crank shaft laterally. Since the first link and the second crank arm have fixed angular relationship during rotation of the driving member and eccentric cap relative to the driven element, or crank shaft, the throw of the crank pin carried by the second crank arm is increased proportionally greater than the throw of the crank pin driven by the first crank arm. In other words, the throws of the crank pins are differentially varied. In this manner, the driver's wiper blade is moved to the depressed parked position into engagement with the lower reveal molding of the windshield throughout an angle of substantially 10° whereas the passenger's blade is moved throughout a parking angle of substantially 25° on top of the driver's blade and in firm engagement therewith.

Further objects and advantages of the present invention will be apparent from the following description, reference being had to the accompanying drawings, wherein a preferred embodiment of the present invention is clearly shown, and wherein similar numerals depict similar parts throughout the several views.

In the drawings:

FIGURE 1 is a fragmentary perspective view, partly in section and partly in elevation, of a vehicle equipped with windshield cleaning mechanism constructed according to this invention.

FIGURE 2 is a fragmentary view, in elevation, with a portion of the drive linkage and the variable throw crank assembly in the running position.

FIGURES 3 and 4 are enlarged fragmentary sectional views taken along line 3—3 and 4—4 of FIGURE 2, respectively.

FIGURE 5 is a fragmentary view, in elevation, of a portion of the drive linkage and the variable throw crank assembly in the parked position.

FIGURE 6 is an enlarged fragmentary, sectional view taken along lines 6—6 of FIGURE 5.

With particular reference to FIGURE 1, a portion of a vehicle is shown including a wrap around windshield 10 having a lower reveal molding 12. The center of the windshield is indicated by the broken line 14. The vehicle also includes a cowl 16 and a firewall 18, an electric motor driven wiper unit 20 being attached to the firewall 18. The wiper unit 20 is of the general type disclosed in the aforementioned copending application Serial No. 718,789 and thus includes a generally vertically arranged driven element, or crank shaft 22.

A pair of spaced brackets 24 and 26 are attached to the firewall beneath the cowl 16, pivot shafts 28 and 30 being rotatably supported in the brackets 24 and 26, respectively. The pivot shafts 28 and 30 project through the cowl 16 and are drivingly connected to a pair of oscillatory wiper arms 32 and 34, respectively, having spring-hinge connected inner and outer sections. The outer sections of the wiper arms 32 and 34 carry wiper blades 36 and 38, respectively. The wiper blade 36 will hereinafter be referred to as the driver's, or lower blade, and the blade 38 will hereinafter be referred to as the passenger's or upper, blade.

The wiper blades 36 and 38 are asymmetrically oscillated, or oscillated in phase opposition, by drive means, to be described, so that the passenger's blade 38 has a running stroke of substantially 75° depicted by the angle A and the driver's blade 36 has a running stroke of substantially 90° depicted by the angle B.

The wiper blades 36 and 38 are shown, in full lines, at their normal running inboard stroke end limit positions, from which it can be seen that the running inboard stroke end positions of the blades are angularly offset. The lengths of the arms and the blades, and the distance between the pivot shafts 28 and 30 is such that during running operation, the wiper paths of the blades 36 and 38 overlap adjacent their inboard stroke ends in the area depicted by numeral 40 in the central portion of the windshield 10. When the wiper blades 36 and 38 are moved to their depressed parked positions, as depicted by dotted lines to FIGURE 1, the driver's blade 36 is moved from its running inboard stroke end position through an angle D into firm engagement with the lower reveal molding 12. The passenger's blade 38 is moved throughout an angle C into firm engagement with the driver's blade, with substantially half the length of the blade 38 overlying the blade 36. The parking angle D is substantially 10°, and the parking angle C is substantially 25° so that the total stroke of both blades, that is, the parking stroke and the running stroke, is the same, substantially 100°.

With reference to FIGURES 2 through 4, the electric motor driven wiper unit includes a rotatable driving member having a sleeve-type hub 42 rotatably journalled by a bushing 44 in a housing 46. The sleeve 42 has three diametrically opposed axially extending prongs 42a which extend through slots in a washer 48 seated on the top of the housing 46, a seal 50 seated on the washer 48, and a shield 52 seated on the seal 50. The projections 42a are also interlocked with internal grooves on an eccentric cap 54 which seats on a shoulder 52a of the seal 50. The seal 50 prevents the entrance of moisture or other foreign material into the housing 46. The projections 42a on the hub 42 drivingly interconnect the eccentric cap 54, the shield 52, the seal 50 and the washer 48 for rotation with the hub 42 about the axis of the hub depicted by broken line 56. The center of the eccentric cap is depicted by the broken line 58.

The driven element, or shaft, 22 is eccentrically journalled in an opening 60 in the eccentric cap 54. The axis of the shaft 22 is depicted by broken line 62. The eccentric cap 54 is interlocked with a second seal 64, so that the seal 64 rotates with the eccentric cap 54, and the shaft 22 extends through the seal 64. The shaft 22 is formed with an annular groove 22a which receives a snap ring 66 for preventing axial movement of the eccentric cap 54 relative to the shaft 22.

In accordance with the disclosure and teachings of the aforementioned copending application Serial No. 718,789, during running operation the shaft 22 is connected to rotate with the hub 42 about its axis 56. The shaft 22 has a first crank arm 68 attached thereto by means of a nut and lock washer assembly 70. The outer end of the crank arm 68 carries a hub 72 within which a first crank pin 74 is journalled by a bushing 76. The crank pin 74 has pairs of flats 78 and 80 on opposite ends thereof. A second crank arm 82 has one end engaging the flats 78 so as to be drivingly connected to the crank pin 74. The other end of the second crank arm 82 carries a second crank pin 84. One end of a first link 86 engages the flats 80 of the first crank pin 74, the other end of the first link 86 having a pin 88 rigidly attached thereto. A second link 90 rotatably receives the pin 88 at one end, the other end of the link 90 being journalled on surface 54a of the eccentric cap 54.

Since the second crank arm 82 and the first link 86 are rigidly drivingly connected to the crank pin 74, the angular relationship, or the angular orientation of the crank arm 82 and the link 86 remains fixed at all times, as depicted in FIGURES 2 and 5. During running operation wherein the shaft 22 is drivingly connected with the hub 42, the shaft 22 and eccentric cap 54 are rotated with the hub 42 about the axis 56. As seen in FIGURE 2, the crank pins 74 and 84 are unequally radially spaced from the axis 56 of the hub 42 and describe circles 74a and 84a during running operation. More particularly, the radius of the crank pin 84 is less than the radius of the crank pin 74. In a specific installation, the radius of the crank pin 74 during running operation may be on the order of 1.65 inches while the radius of the crank pin 84 may be on the order of 1.48 inches.

Referring to FIGURES 1 and 2, the inner end of a connecting link 92 is rotatably connected to the crank pin 74, and the inner end of a second connecting link 94 is rotatably connected to the crank pin 84. The outer end of the connecting link 92 is connected through a ball and socket joint 96 to the outer end of a drive arm 98, the inner end of which is drivingly connected to the pivot shaft 28. The outer end of the drive link 94 is connected through a ball and socket joint 100 to one end of a reversing link, or bellcrank, 102 having a fixed intermediate pivot 104 carried by the bracket 26. The other end of the reversing link 102 is rotatably connected to one end of a connecting arm 106, the other end of which is rotatably connected to the outer end of a drive arm 108. The inner end of the drive arm 108 is drivingly connected to the pivot shaft 30. Accordingly, during running operation of the wiper unit 20, wherein the crank assembly including pins 74 and 84 describes circles 74a and 84a, respectively, as seen in FIGURE 2, the wiper blades 36 and 38 will be oscillated asymmetrically throughout their running strokes as depicted in FIGURE 1. The geometry of the linkage for the driver's blade 36 including the crank pin 74 having a radius larger than the crank pin 84, is such that the running stroke of the blade 36 is substantially 90°, while the geometry of the links for the passenger's blade 38 including the crank pin 84 is such that the running stroke for the passenger's blade is substantially 75°.

During parking operation, which is automatically effected upon manipulation of the wiper control switch to the "off" position, rotation of the shaft 22 is arrested when the wiper blades 36 and 38 arrive at their running inboard stroke end positions as depicted in FIGURE 1. At this time the crank pins 74 and 84 are in the position depicted in FIGURE 2. Referring to FIGURES 5 and 6, during parking operation, the driving member in the hub 42 continues to rotate throughout 180°, and shifts the shaft 22 laterally from one side of the axis 56 of the hub 42 to the other side thereof, as seen in FIGURE 6. The eccentric cap 54 also rotates relative to the shaft 22. By shifting the position of shaft 22, the radial distance E between the center of the crank pin 74 and the axis 56, as seen in FIGURE 2, is increased to E' as seen in FIGURE 5. The distance E' is equal to the distance E plus twice the distance F which is equal to the distance between the axes 56 and 62. This increase in the radius, or throw of the crank pin may be on the order of .25 inch, and is sufficient to move the wiper blade 36 into the angle D to a depressed parked position in engagement with the lower reveal molding 12, as seen in FIGURE 1.

During rotation of the eccentric cap 54 relative to the shaft 22, the link 90 is shifted laterally relative to the shaft 22 through the distance H, thereby rotating link 86 about the crank pin 74 in the counterclockwise direction as viewed in FIGURE 2 to the position of FIGURE 5. The distance H is the distance between the center 62 of the shaft 22 and the center 58 of the eccentric cap 54. Since the link 86 and the crank arm 82 have a fixed angular relationship at all times by reason of their both being drivingly connected to the crank pin 74, counterclockwise rotation of the crank 86 about the crank pin 74 imparts counterclockwise rotation to the crank arm 82 about the crank 74 from the position of FIGURE 2 to the position of FIGURE 5. Accordingly, the radial distance of the crank pin 84 from the axis 62 of the shaft 22 increases from the distance G in FIGURE 2 to the distance G' in FIGURE 5. The radial distance G' is equal to the distance G plus twice the distance F and twice the distance H. Thus, during parking operation, the throws of the cranks 74 and 84 are differentially varied. In this manner, the wiper blade 38 is moved to the depressed parked position on top of, or overlapping, blade 36 throughout an angle C of substantially 25°. The throw of the crank pin 84 may be increased on the order of .75 inch.

During running operation of the wiper blades, the driver's blade 36 traverses the overlapped area 40 of the windshield substantially ahead of the wiper blade 38. However, oscillation of the wiper blades is substantially symmetrical as blades 36 and 38 arrive at both their running inboard and outboard stroke end positions substantially simultaneously. In this manner, interference between the blades 36 and 38 is precluded. During parking operation, the blade 36 moves into engagement with the lower reveal molding 12 before blade 38 engages the blade 36. When the wiper motor is initially energized, the blade 38 moves out of engagement with the wiper blade 36 to its running inboard stroke end limit position while the blade 36 moves to its running stroke end position during rotation of the hub 42 relative to the shaft 22 from the position of FIGURE 6 to the position of FIGURE 3. During this movement, the throws of the crank pins 74 and 84 are reduced to the radii shown in FIGURE 2 whereas the shaft 22 is again drivingly connected for rotation with the hub 42 about the axis 56.

While the embodiment of the invention as herein disclosed constitutes a preferred form, it is to be understood that other forms might be adopted.

What is claimed is as follows:

1. Cleaning mechanism for a vehicular windshield including, a pair of oscillatable wiper blades, said wiper blades being movable throughout running strokes and to depressed parked positions beyond the inboard stroke end limits of said running strokes, said wiper blades being arranged to have overlapping paths adjacent the central portions of the windshield during their running strokes and having their inboard stroke end limits angularly offset with respect to each other, means for imparting asymmetrical oscillation to said wiper blades throughout running strokes of different angular extent including a crank assembly comprising a pair of cranks having different throws, and means for moving said wiper blades throughout parking strokes of different angular extent to their depressed parked position.

2. Cleaning mechanism for a vehicular windshield including, a pair of oscillatable wiper blades, said wiper blades being movable throughout running strokes and to depressed parked positions beyond the inboard stroke end limits of said running strokes, said wiper blades being arranged to have overlapping paths adjacent the central portions of the windshield during their running strokes and having their inboard stroke end limits angularly offset with respect to each other, means for imparting asymmetrical oscillation to said wiper blades throughout running strokes of different angular extent including a crank assembly comprising a pair of cranks having different throws, and means operable to differentially vary the throws of said cranks to move said wiper blades throughout parking strokes of different angular extent to their depressed parked positions.

3. A variable throw crank assembly including, a first rotary crank, a second rotary crank operatively connected to said first rotary crank so as to be rotated thereby, said first and second cranks having different throws, means operable to rotate said cranks while maintaining their respective throws substantially constant, and means operable to differentially vary the throws of said cranks.

4. A variable throw crank assembly including, a first rotary crank, a second rotary crank operatively connected to said first crank so as to be rotated thereby, said first and second cranks having different throws, means operable to rotate said cranks and maintain their respective throws substantially constant, and means for arresting rotation of said cranks and thereafter differentially varying the throws thereof.

5. A variable throw crank assembly including, a first rotary crank arm carrying a first crank pin, a second rotary crank arm connected to said fist crank pin so as to be rotated thereby, said second crank arm carrying a second crank pin, the throws of said first and second crank pins being different, means operable to rotate said first and second crank arms while maintaining the respective throws of said first and second crank pins substantially constant, and means operable to differentially vary the throws of said first and second crank pins.

6. A variable throw crank assembly including, a rotary driving member, a driven element eccentrically supported for rotation with respect to said driving member, a first rotary crank connected to said driven element, a second rotary crank operatively connected to said first crank so as to be driven thereby, said first and second cranks having different throws, and means operable to rotate said driving member to rotate said driven element about the axis of said driving member whereby said first and second cranks will be driven by said driven element with the respective throws thereof being maintained substantially constant, the throws of said cranks being differentially varied upon relative rotation between said driving member and said driven element.

7. A variable throw crank assembly including, a rotatable driving member, a driven element rotatable journalled eccentrically with respect to said driving member, a first rotary crank drivingly connected to said driven element, a second rotary crank operatively connected to said first crank so as to be driven thereby, said first and second cranks having different throws, means for imparting rotation to said driving member to rotate said driven element and said cranks while maintaining the respective throws thereof substantially constant, and means including an eccentric for differentially varying the throws of said cranks upon relative rotation between said driving member and said driven element.

8. A variable throw crank assembly including, a rotatable driving member, a driven element rotatably journalled eccentrically with respect to said driving member, an eccentric drivingly connected with said driving member, a first crank arm rigidly connected to said driven element and carrying a first crank pin, a second crank arm rigidly connected to said first crank pin so as to be driven thereby and carrying a second crank pin, a first link journalled on said eccentric and rotatably carrying a pin at its outer end, a second link drivingly connected to the pin of the first link and drivingly connected to the first crank pin whereby the angular orientation of said second link and said second crank arm remains fixed at all times, said first and second crank pins having different throws, and means for imparting rotation to said driving member to rotate said driven element and said first and second crank arms while the respective throws of said first and second crank pins are maintained substantially constant, the throw of said first crank pin being varied upon relative rotation between said driving member and said driven element, and the throw of said second crank pin being varied to a greater extent than the throw of said first crank pin due to pivotal movement of said second link and said second crank arm during relative rotation between said driving member and eccentric and said driven element.

9. The variable throw crank assembly set forth in claim 8 wherein said rotatable driving member comprises a sleeve.

10. The variable throw crank assembly set forth in claim 9 wherein said sleeve has a plurality of axially extending projections, and wherein said eccentric has a plurality of notches drivingly receiving the projections of said eccentric.

11. The variable throw crank assembly set forth in claim 10 wherein said sleeve is journalled in a housing, and wherein said housing is engaged by a seal assembly, the projections on said eccentric extending through said seal assembly for imparting rotation thereto, said seal assembly being disposed between said housing and said eccentric.

12. The variable throw crank assembly set forth in claim 11 including a second seal assembly disposed between said eccentric and said first crank arm, said second seal assembly being interlocked with said eccentric.

References Cited in the file of this patent

UNITED STATES PATENTS

| | | |
|---|---|---|
| 2,753,721 | Latta | July 10, 1956 |
| 2,866,344 | Reese | Dec. 30, 1958 |
| 2,919,588 | Sundt | Jan. 5, 1960 |